United States Patent
Sohn et al.

(10) Patent No.: US 7,023,657 B2
(45) Date of Patent: Apr. 4, 2006

(54) HARD DISK DRIVE HAVING A DAMPER FOR REDUCING VIBRATIONS

(75) Inventors: Jin-seung Sohn, Seoul (KR); Sung-hoon Choa, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 24 days.

(21) Appl. No.: 10/175,952

(22) Filed: Jun. 21, 2002

(65) Prior Publication Data

US 2003/0048576 A1    Mar. 13, 2003

(30) Foreign Application Priority Data

Sep. 10, 2001    (KR) ............... 2001-55557

(51) Int. Cl.
    *G11B 17/02*    (2006.01)
(52) U.S. Cl. .................................. 360/99.08
(58) Field of Classification Search ............ 360/99.08, 360/97.01, 97.04, 97.02, 99.02, 99.06; 369/75.1, 369/77.7, 77.2; 181/207; 248/632; 428/137, 428/213; 267/141
    See application file for complete search history.

(56) References Cited

U.S. PATENT DOCUMENTS

| | | | | |
|---|---|---|---|---|
| 5,213,879 A | * | 5/1993 | Niwa et al. ................ | 428/213 |
| 5,330,165 A | * | 7/1994 | van Goubergen ........... | 267/141 |
| 5,366,200 A | * | 11/1994 | Scura ........................ | 248/632 |
| 6,177,173 B1 | * | 1/2001 | Nelson ....................... | 428/137 |
| 6,249,400 B1 | * | 6/2001 | Hong et al. ............... | 360/97.02 |
| 6,536,555 B1 | * | 3/2003 | Kelsic et al. ............... | 181/207 |

FOREIGN PATENT DOCUMENTS

| | | | |
|---|---|---|---|
| DE | 19916013 A1 | * | 10/1999 |
| JP | 9-63215 A | | 3/1997 |
| JP | 2001-202682 A | | 7/2001 |

* cited by examiner

*Primary Examiner*—Tianjie Chen
(74) *Attorney, Agent, or Firm*—Sughrue Mion, PLLC

(57) ABSTRACT

A hard disk drive having a vibration reducing damper is disclosed. The hard disk drive is provided with a damper which is interposed between a through hole provided at a cover plate and a screw joined to the upper end of the shaft of a spindle motor, and includes at least one viscoelastic material layer. It is preferable that the damper has a multi-layered structure in which at least one high stiffness layer has relatively higher stiffness and at least one low stiffness layer made of a viscoelastic material has relatively lower stiffness. With the above configuration, the damper restrains vibrations generated by the spindle from being transferred to the cover plate, noises generated by the hard disk drive are reduced, and, in addition, since vibrations generated by the spindle motor are damped, disk fluttering is reduced.

18 Claims, 9 Drawing Sheets

FIG. 1

PRIOR ART

HARD DISK DRIVE HAVING A DAMPER FOR REDUCING VIBRATIONS

RELATED APPLICATION

The present Application claims priority from Korean Patent Application No. 2001-55557 filed on Sep. 10, 2001; the disclosure of which is incorporated herein by reference.

BACKGROUND OF THE INVENTION

1. Field of the Invention

The present invention relates to a hard disk drive, and more particularly, to a hard disk drive having a vibration-reducing damper between a spindle motor and a cover plate.

2. Description of the Related Art

A hard disk drive is one of the auxiliary memory systems of a computer, and is intended to read stored data from a stack of magnetic disks, or to write data to the magnetic disks with magnetic heads. Recently, various research and development have been performed in order to realize higher speed, more increased storage capacity, and more reduced vibrations and noises of such a hard disk drive.

Figure 1:
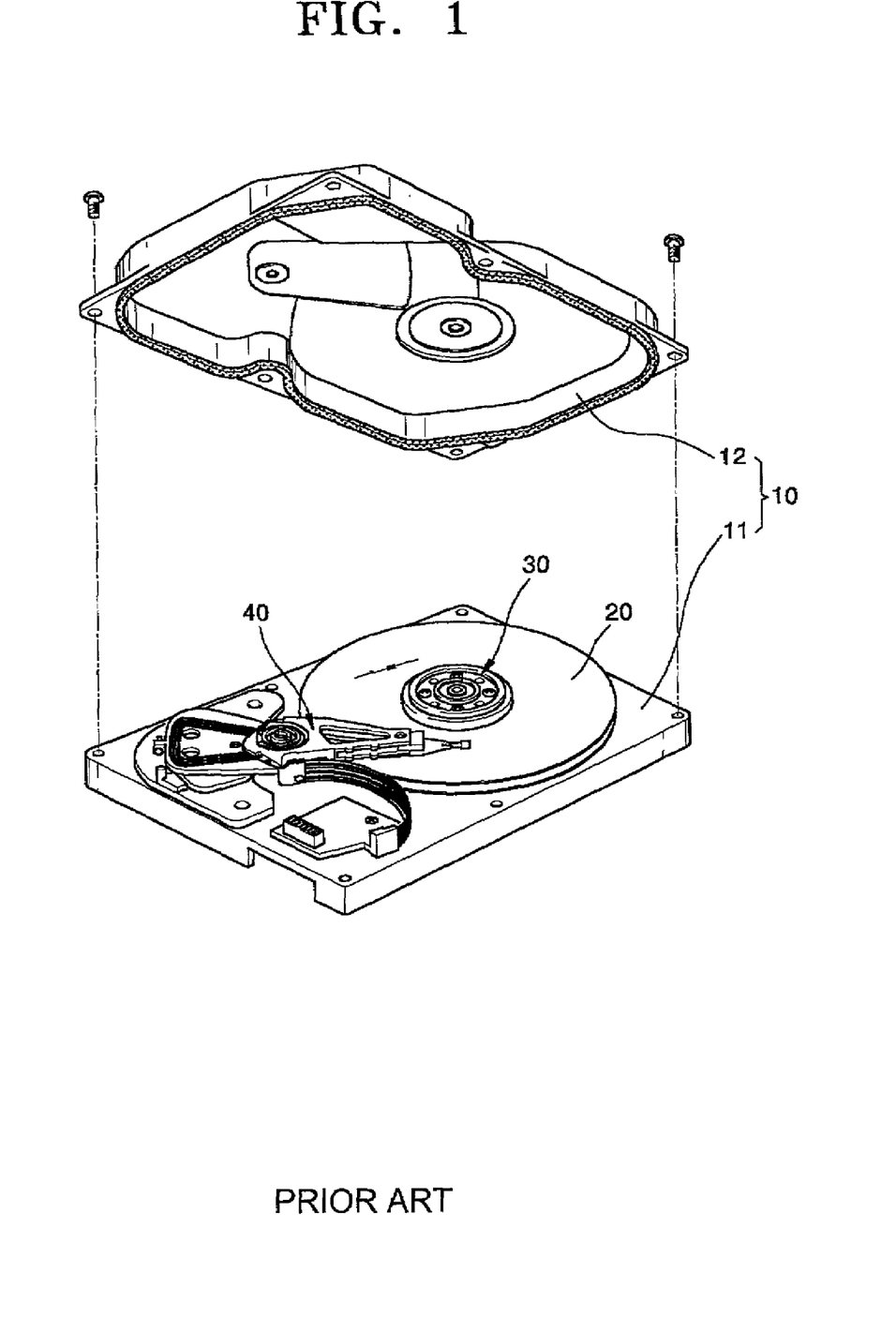
FIG. 1 is a schematic exploded perspective view illustrating a conventional hard disk drive.
Figure 2:
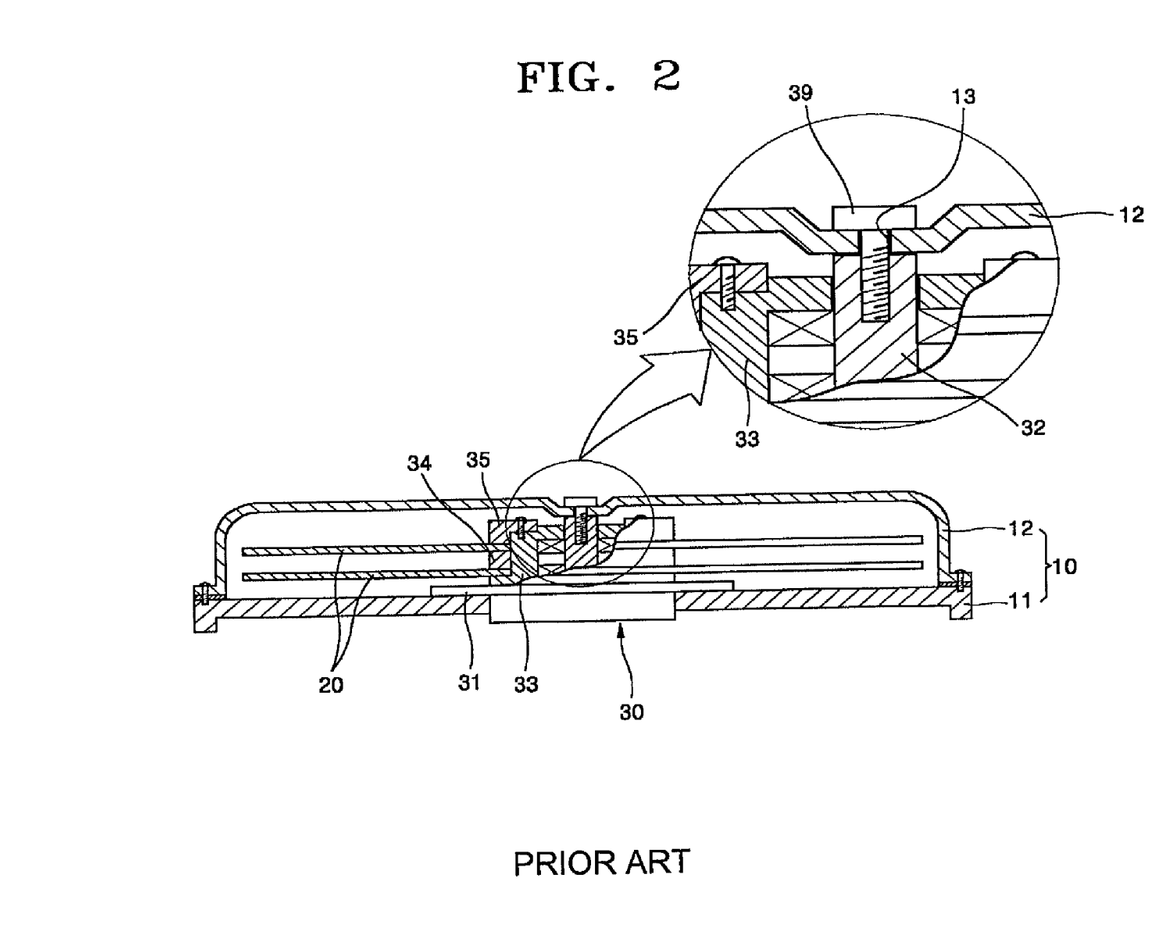
FIG. 2 is a vertical section view illustrating an assembly structure of a housing and a spindle motor of the hard disk drive shown in FIG. 1.

FIG. 1 is an exploded perspective view schematically illustrating a conventional hard disk drive, and FIG. 2 is a vertical section view illustrating an assembly structure of a housing and a spindle motor of the hard disk drive shown in FIG. 1.

Referring to FIG. 1, a hard-disk drive is provided with a housing 10, a spindle motor 30 installed in the housing 10 for rotating magnetic disk unit (hard disk unit) 20, and a head assembly 40 for reading data from the magnetic disk unit 20 or writing data to the magnetic disk unit 20.

The housing 10 is installed in a main body of a computer, and comprises a base plate 11 for supporting the spindle motor 30 and the head stack assembly 40, and a cover plate 12 which is joined to the upper part of the base plate 11 for enveloping and protecting the magnetic disk unit 20 and the like. The housing 10 is usually made of a stainless steel or aluminum alloy material.

The magnetic disk unit 20, a recording medium for writing data thereto, has one or a plurality of magnetic disks spaced a predetermined distance from each other, and is installed to be rotated by the spindle motor 30.

Now, an assembly structure of the housing 10, the spindle motor 30, and the magnetic disk unit 20 will be described in detail with reference to FIG. 2.

The spindle motor 30 is supported by a flange 31 which is fixedly installed on the base plate 11. The lower end portion of a shaft 32 of the spindle motor 30 is fixed to the flange 31, and the upper end portion thereof is directly fixed to the cover plate 12 by a screw 39. To this end, a through hole 13 is formed at the cover plate 12 so that the threaded portion of the screw can pass through the through hole 13. A hub 33 is installed on the outer circumference of the shaft 32 with bearings interposed therebetween so that the hub 33 can rotate. The magnetic disk unit 20 is fixedly installed on the outer circumference of the hub 33. When the magnetic disk unit 20 has a plurality of magnetic disks, one or more ring-shaped spacers are installed on the outer circumference of the hub 33 to maintain a predetermined distance between the disks. In addition, a clamp 35 is joined to the upper portion of the hub 33 to prevent the magnetic disk unit 20 from being separated from the hub 33.

As described above, the conventional hard disk drive has a structure in which the shaft 32 of the spindle motor 30 is directly joined and fixed to the cover plate 12. As a result, since vibrations generated by the spindle motor 30 are directly transferred to the cover plate 12, and again transferred to the base plate 11 connected to the cover plate 12, there is a problem in which the whole hard disk drive vibrates, and accordingly noises increase.

The vibrations generated by the spindle motor 30 are transferred to the cover plate 12 in the form of vibrations in the axial direction of the shaft 12 and rocking mode vibrations. Although, in order to block such transference of vibrations, there is a method in which the shaft 32 is not joined to the cover plate 12, this results in another problem. That is to say, when the shaft 32 is not joined to the cover plate 12, the rocking mode frequency of the spindle motor 30 becomes lower. Accordingly, since the rocking mode frequency may match a vibration frequency of the spindle motor 30 due to allowable tolerance, assembly tolerance, and the like of a ball bearing of the spindle motor 30, there is a possibility that the resonance phenomenon can severely affect the performance of the hard disk drive. In addition, vibrations generated by the spindle motor 30 result in fluttering of the disk 20 and this also affects the performance of the hard disk drive.

Therefore, in order to ensure the reliability of the performance of a hard disk drive, vibrations generated during the operation of the hard disk drive need to be reduced. Further, since a personal computer employing a hard disk drive must be compatible with relatively quiet surroundings, restraint of vibrations of a hard disk drive, and resultant reduction of noises are increasingly important problems to be solved.

SUMMARY OF THE INVENTION

To solve the above-described problems, it is an aspect of the present invention to provide a hard disk drive provided with a vibration reducing damper for reducing noises by restraining vibrations generated by a spindle motor from transferring to a cover plate of a housing thereof.

It is another aspect of the present invention to provide a hard disk drive provided with a vibration-reducing damper for reducing vibrations of disks by damping vibrations generated by a spindle motor.

Accordingly, to achieve the above aspects, there is provided a hard disk drive including a housing having a base plate and a cover plate provided with a through hole, a spindle motor including a shaft which is supported on the base plate and the upper end of which is joined to the cover plate by a screw inserted through the through hole, and a hub installed around the outer circumference of the shaft to be rotatable, at least one data storage disk which is joined to the outside of the hub to be rotated together with the hub, a head assembly for recording data onto the disk and reading recorded data from the disk, and a damper which is interposed between the screw and the cover plate and includes at least one viscoelastic material layer.

In the present invention, the damper restrains vibrations generated by the spindle motor from being transferred to the cover plate so as to reduce noises, and damps the vibrations so as to reduce fluttering of the disk.

The damper may be composed of a ring-shaped viscoelastic material layer. For example, the head portion of the screw and the through hole are preferably, but not necessarily, tapered so that the diameters thereof become smaller toward the shaft. Further, the damper is preferably, but not necessarily, tapered so as to closely contact the outer circumferential surface of the head portion of the screw and the inner circumferential surface of the through hole while interposed therebetween.

Therefore, the damper can be installed easily to closely contact the inner circumferential surface of the through hole, and the shaft can be fixed to the cover plate more strongly with the screw.

In addition, the damper is preferably, but not necessarily limited to being, formed by attaching a viscoelastic material layer having a predetermined thickness directly to the outer circumferential surface of the head portion of the screw.

Accordingly, since the damper is attached to the screw in advance, assembly thereof is simple, and the damper is prevented from escaping from its place.

Further, the damper preferably, but not necessarily, has a multi-layered structure in which at least one high stiffness layer having relatively higher stiffness and at least one low stiffness layer having relatively lower stiffness are alternately laminated.

In this example, but not by way of limitation, the damper may have a dual-layered structure composed of a high stiffness layer and a low stiffness layer, or a tri-layered structure composed of two high stiffness layers and one low stiffness layer interposed therebetween.

Preferably, but not necessarily, the damper has a multi-layered structure composed of a plurality of high stiffness layers and a plurality of low stiffness layers that are alternately laminated.

In addition, it is preferable, but not necessary, that the thickness of the low stiffness layer is thinner than the thickness of the high stiffness layer.

Further, it is preferable, but not necessary, that the high stiffness layer is made of a metal or plastic material, and the viscoelastic layer includes rubber or resin.

According to a non-limiting example of the present invention, since the stiffness in radial directions is reduced to a relatively less extent, and the stiffness in an axial direction is reduced to a relatively more extent in the damper, the rocking mode frequency can be kept to be sufficiently high due to the damper while vibrations in an axial direction generated by the spindle motor are restrained from being transferred to the cover plate due to the damper.

BRIEF DESCRIPTION OF THE DRAWINGS

The above aspects and advantages of the present invention will become more apparent by describing in detail illustrative, non-limiting embodiments thereof with reference to the attached drawings, in which:

FIGS. 7A and 7B are diagrams illustrating behaviors of a vibration reducing damper having a multi-layer structure according to an illustrative, non-limiting embodiment of the present invention.

FIG. 9A shows rocking frequencies and disk fluttering of the conventional hard disk drive, and FIG. 9B shows rocking frequencies and disk fluttering of the hard disk drive according to the present invention.

DETAILED DESCRIPTION OF THE ILLUSTRATIVE EMBODIMENTS

Figure 3:
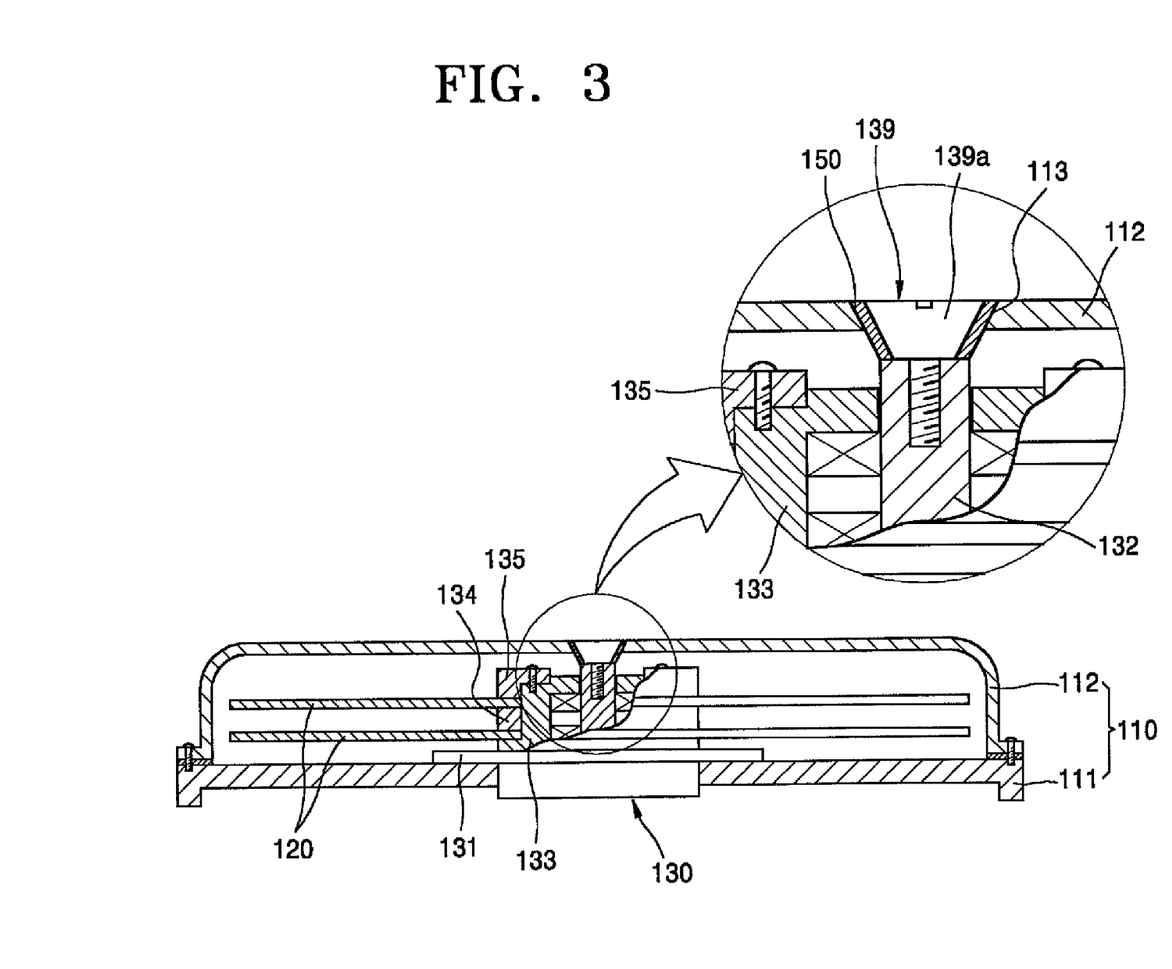
FIG. 3 is a vertical section view illustrating an assembly structure of a housing and a spindle motor of a hard disk drive provided with a vibration reducing damper according to a first illustrative, non-limiting embodiment of the present invention.

FIG. 3 is a vertical section view illustrating an assembly structure of a housing and a spindle motor of a hard disk drive provided with a vibration reducing damper according to a first embodiment of the present invention.

Referring to FIG. 3, a hard disk drive according to a first illustrative, non-limiting embodiment of the present invention includes a housing 110 which composed of a base plate 111 and a cover plate 112, and a spindle motor 130, a magnetic disk unit 120, and a head assembly 40 (please refer to FIG. 1) are installed in the housing 110.

The base plate 111 of the housing 110 supports the spindle motor 130 and the head assembly, and the cover plate 112 is joined to the upper part of the base plate 111, and serves to envelop and protect the magnetic unit 120 and the like. In addition, a through hole 113 is provided at a predetermined position of the cover plate 112 so that a screw 139 for joining a shaft 132 of the spindle motor 130 to the cover plate 112 can pass through the through hole 113.

The spindle motor 130 is intended to rotate the magnetic disk unit 120, and is supported by a flange 131 which is fixedly installed on the base plate 111. The lower end portion of the shaft 132 of the spindle motor 130 is fixed to the flange 131, and the upper end portion thereof is fixed to the cover plate 112 by the screw 139. A hub 133 is rotatably installed around the shaft 132 generally with bearings interposed therebetween.

The magnetic disk unit 120 is a recording medium, and is fitted around the outer circumference of the hub 133. The magnetic disk unit 120 may be composed of one magnetic disk, or may be composed of two or more magnetic disks to increase a recording capacity of data. When the magnetic disk unit 120 is composed of two or more magnetic disks, one or more ring-shaped spacers 134 are installed around the outer circumference of the hub 133 to maintain a predetermined distance between the disks. In addition, a clamp 135 is joined to the upper portion of the hub 133 to prevent the magnetic disk unit 120 from being separated from the hub 133.

The head assembly is intended to read data from the magnetic disk unit 120 or to write data to the magnetic disk unit 120, and is installed in the housing 110 while being supported on the base plate 111.

In addition, a hard disk drive according to a first embodiment of the present invention includes, but is not limited to, a damper 150 interposed between the screw 139 and the cover plate 112 as a characteristic element of a non-limiting example of the present invention. The damper 150 is composed of one layer made of a viscoelastic material such as rubber or resin, and has a ring shape so that the ring-shaped damper 150 can be inserted between the outer circumferential surface of the head portion 139a of the screw 139 and the inner circumferential surface of the through hole 113 of the cover plate 112, and contact the two surfaces closely.

As described above, in the hard disk drive according to the first illustrative, non-limiting embodiment of the present invention, since the shaft 132 of the spindle motor 130 is not directly joined to the cover plate 112 by the screw 139, and the viscoelastic damper 150 is interposed between the screw 139 and the cover plate 112, vibrations generated by the spindle motor 130 are prevented from being transferred to the cover plate 112. That is, since the damper 150 damps vibrations transferred from the spindle motor 130 to the housing 110, vibrations of the whole hard disk drive are reduced, and noises generated by the vibrations are reduced.

In addition, the damper 150 serves to damp vibrations of the spindle motor 130, and therefore disk fluttering due to vibrations of the spindle motor 130 is reduced. This will be described in detail later.

As shown in FIG. 3, the damper 150 preferably, but not necessarily, has a tapered ring shape. Accordingly, the head portion 139a of the screw 139 and the inner circumferential surface of the through hole 113 are, for example, but not by way of limitation, tapered to have smaller diameters toward the shaft 132. Such a shape permits the damper 150 to be inserted closely between the outer circumferential surface of the head portion 139a of the screw 139 and the inner circumferential surface of the through hole 113, and also permits the shaft 132 to be firmly fastened to cover plate 112 by the screw 139.

In addition, it is preferable, but not necessary, that the damper 150 is, in advance, attached to the outer circumferential surface of the head portion 139a of the screw 139 with an adhesive. This permits assembly operations to be performed more easily, and prevents the damper 150 from being separated from its installed place due to vibrations.

Figure 4:
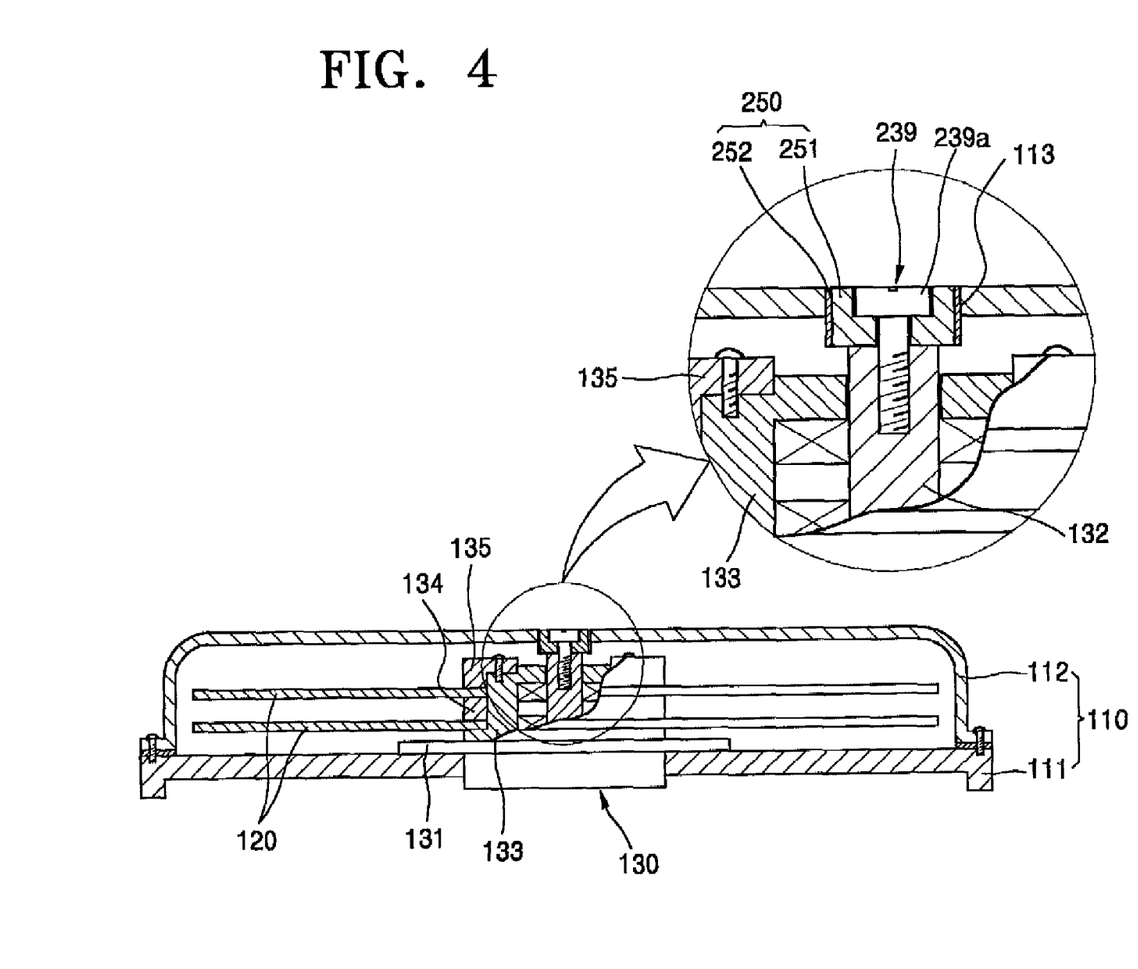
FIG. 4 is a vertical section view illustrating an assembly structure of a housing and a spindle motor of a hard disk drive provided with a vibration reducing damper according to a second illustrative, non-limiting embodiment of the present invention.
Figure 5:
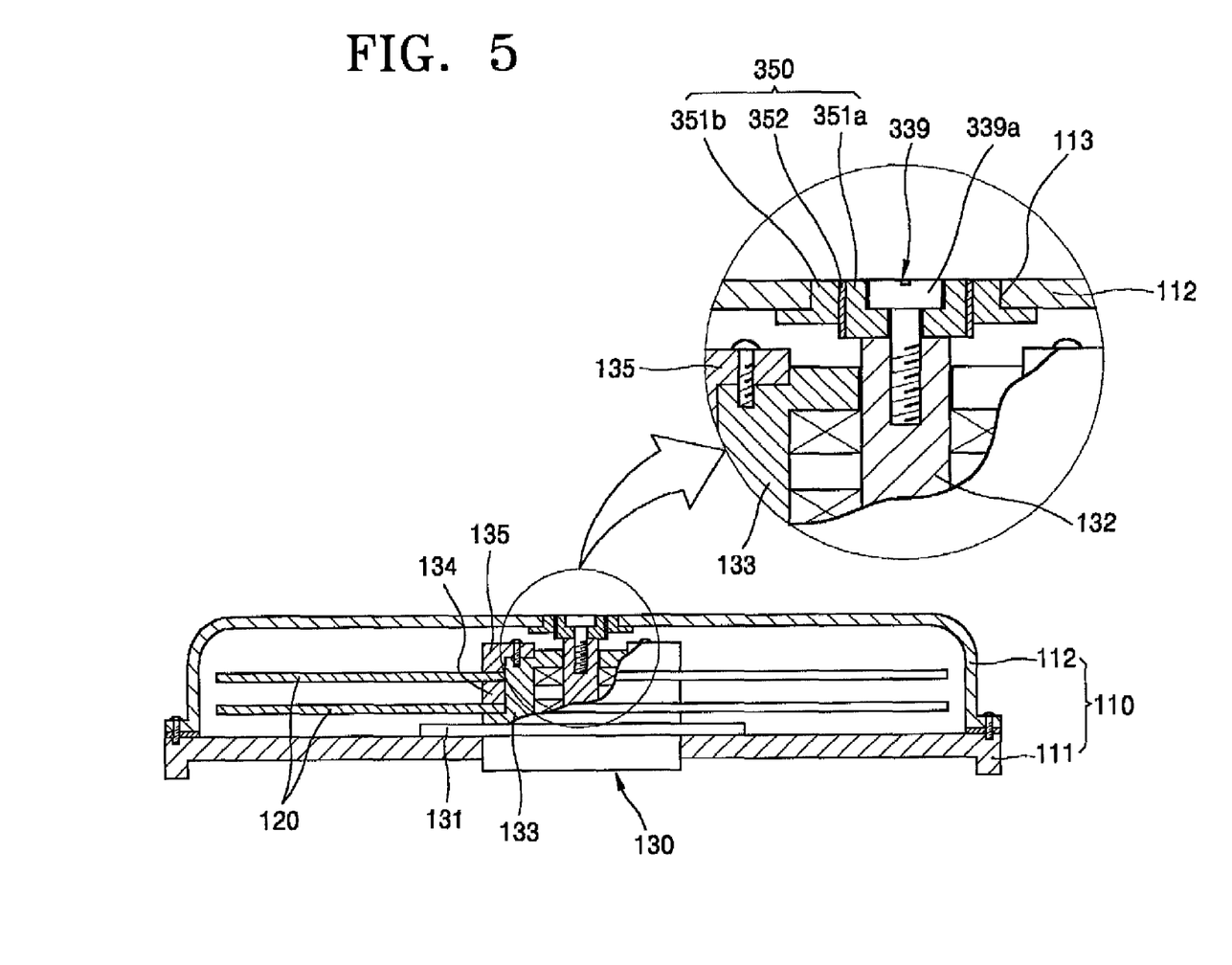
FIG. 5 is a vertical section view illustrating an assembly structure of a housing and a spindle motor of a hard disk drive provided with a vibration reducing damper according to a third illustrative, non-limiting embodiment of the present invention.
Figure 6:
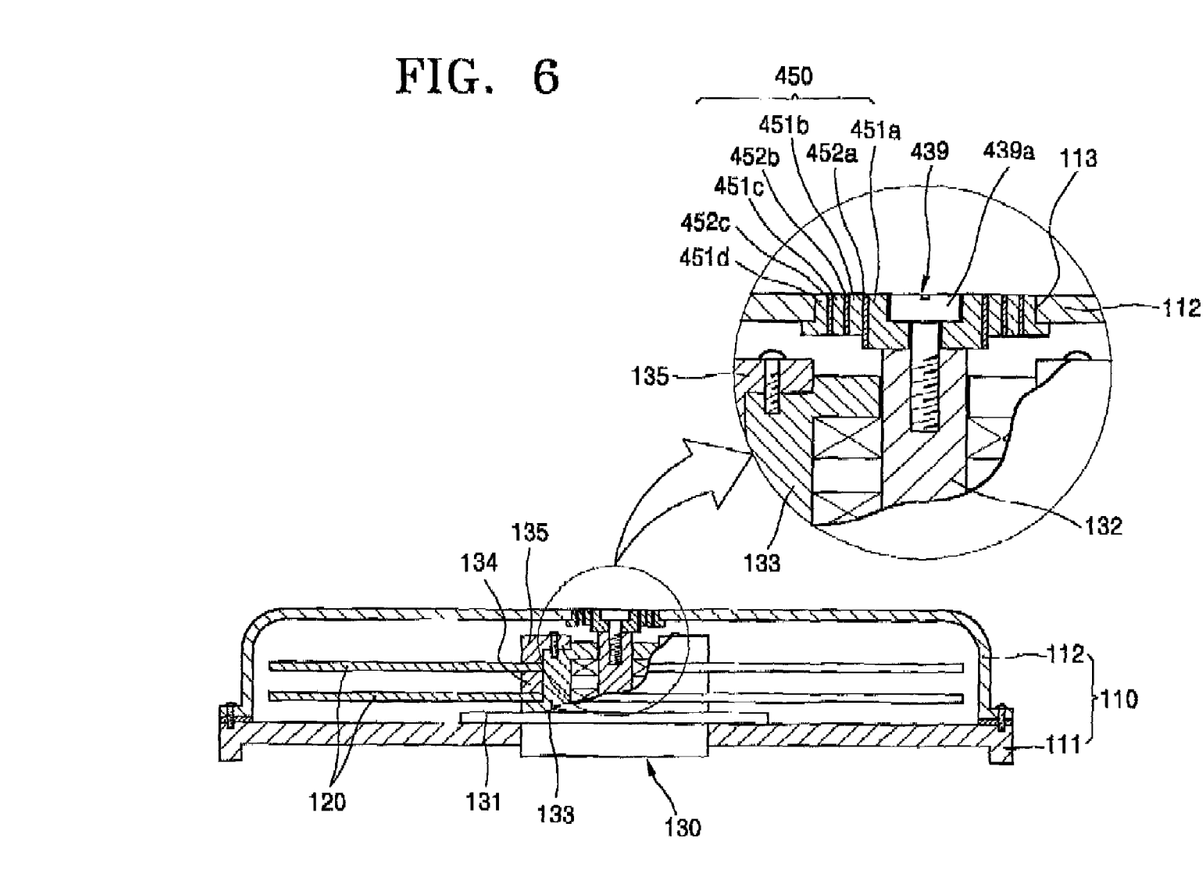
FIG. 6 is a vertical section view illustrating an assembly structure of a housing and a spindle motor of a hard disk drive provided with a vibration reducing damper according to a fourth illustrative, non-limiting embodiment of the present invention.

FIGS. 4 through 6 show vertical section views of hard disk drives according to other illustrative, non-limiting embodiments of the present invention having respective dampers composed of multiple layers. Here, the same reference numerals denote similar members of the above-described first embodiment shown in FIG. 3.

First, referring to FIG. 4, a hard disk drive according to a second illustrative, non-limiting embodiment of the present invention includes, but is not limited to, a damper 250 having a dual-layered structure composed of a high stiffness layer 251 and a low stiffness layer 252, as a characteristic element of the present invention. The high stiffness layer 251 is made of metal or plastic having relatively higher stiffness, and the lower stiffness layer 252 is made of viscoelastic material such as rubber or resin having relatively lower stiffness. The higher stiffness layer 251 has a stepped portion formed on the inner circumferential surface thereof so that the head portion 239a can be seated on the stepped portion. The lower surface of the higher stiffness layer 251 closely contacts the upper surface of a shaft 132. The high stiffness layer 251 acts as a busing for the head portion 239a of a screw 239. In addition, the low stiffness layer 252 is formed to surround the outer circumferential surface of the high stiffness layer 251, and the outer circumferential surface of the lower stiffness layer 252 contact the inner circumferential surface of a cover plate 112.

With the above-described configuration, vibrations generated by a spindle motor 130 are not directly transferred to the cover plate 112, and are indirectly transferred to the cover plate 112 after being damped by the low stiffness layer 252 of the damper 250 via the high stiffness layer 251. Accordingly, vibrations transferred to the cover plate 112 are attenuated markedly, and noises due to vibrations are reduced. Also, disk fluttering can be reduced due to the damper 250 as in the above-described first illustrative, non-limiting embodiment.

Though FIG. 4 shows, by example, but not by way of limitation, that the high stiffness layer 251 of the damper 250 contacts the screw 239, and the low stiffness layer 252 contacts the inner circumferential surface of a through hole 113, to the contrary, the damper 250 may be configured so that the low stiffness layer 252 of the damper 250 contacts the screw 239, and the high stiffness layer 251 contacts the inner circumferential surface of the through hole 113.

Referring to FIG. 5, a hard disk drive according to a third illustrative, non-limiting embodiment of the present invention includes, but is not limited to, a damper 350 having a tri-layered structure composed of two high stiffness layers 351a and 351b and one low stiffness layer 352. The high stiffness layers 351a and 351b are made of metal or plastic having relatively higher stiffness, and the low stiffness 352 is made of an viscoelastic material such as rubber or resin having relatively lower stiffness, as the above-described second illustrative, non-limiting embodiment. The low stiffness layer 352 is interposed between the two high stiffness layers 351a and 351b. Of the two high stiffness layers 351a and 351b, the inner high stiffness layer 351a positioned at the inner side of the low stiffness layer 352 contacts a screw 339, and the outer high stiffness layer 351b positioned at the outer side of the low stiffness layer 352 contacts the inner circumferential surface of a through hole 113 of a cover plate 112. In addition, a stepped portion on which the head portion of the screw 339 is seated is formed so that the inner high stiffness layer 351 a can act as a bushing. The lower surface of the inner high stiffness layer 351 a closely contacts the upper surface of a shaft 132.

In addition, it is preferable, but not necessary, that the thickness of the low stiffness layer 352 is thinner than the thickness of the high stiffness layer 351a and 351b, and this is intended to form the damper 350 in which the stiffness in radial directions is reduced to a relatively less extent, and the stiffness in an axial direction is reduced to a relatively more extent, as will be described in detail later.

With the above damper 350, the rocking-mode frequency can be maintained in a sufficiently high state while axial vibrations generated by a spindle motor 130 are restrained from being transferred to the cover plate 112. In addition, with the damper 350, transference of vibrations can be restrained, and disk fluttering can be reduced.

Referring to FIG. 6, a hard disk drive according to a fourth illustrative, non-limiting embodiment of the present invention includes, but is not limited to, a damper 450 composed of multiple layers in which a plurality of high stiffness layers 451a, 451b, 451c, and 451d and a plurality of low stiffness layers 452a, 452b, and 452c are alternately laminated. Of the plurality of high stiffness layers, the high stiffness layer 451 a positioned at an innermost side contacts a screw 439, and the high stiffness layer 451d positioned at an outermost side contacts the inner circumferential surface of a through hole 113 of a cover plate 112. In addition, a stepped portion on which the head portion 439a of a screw 439 is seated is formed at the inner circumferential surface of the innermost high stiffness layer 451a so that the high stiffness layer 451a can act as a bushing. The lower surface of the high stiffness layer 451 a closely contacts the upper surface of a shaft 132.

In addition, it is preferable, but not necessary, that the thickness of the low stiffness layers 452a, 452b, and 452c is thinner than the thickness of the high stiffness layers 451a, 451b, 451c, and 451d since axial vibrations generated by a spindle motor 130 can be prevented from being transferred to a cover plate 112 and the rocking-mode frequency can be maintained in a sufficiently high state.

Figure 7A:
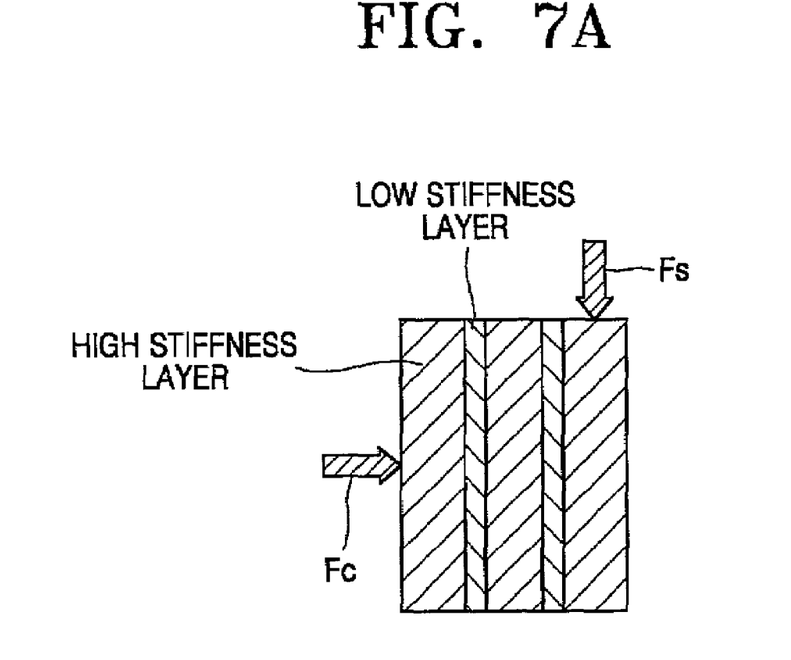
FIG. 7A shows a shape of the damper when no force is applied.
Figure 7B:
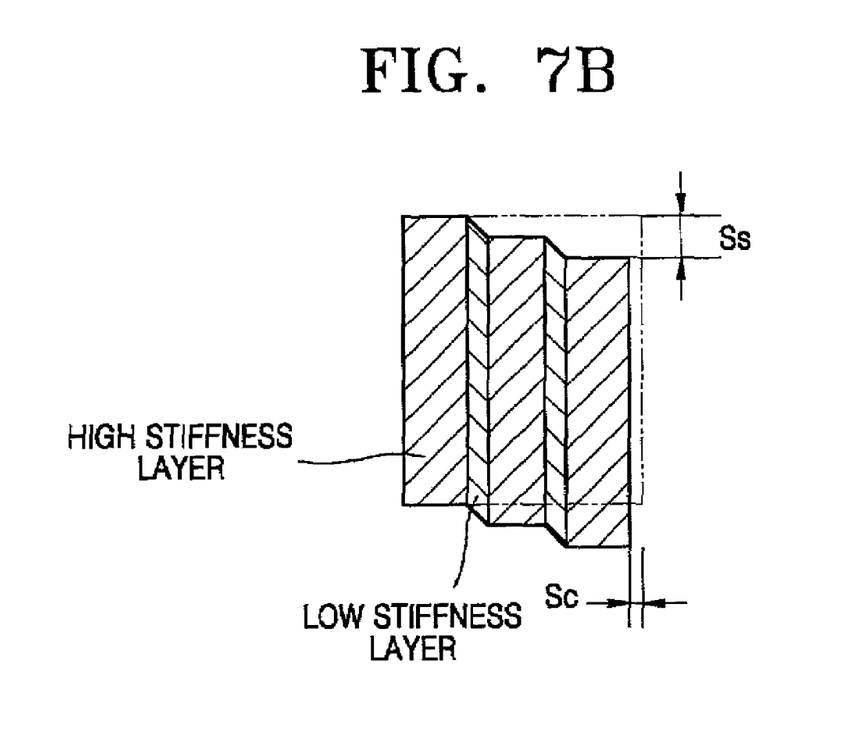
FIG. 7B shows a shape of the damper when a force is being applied.

This will be described in detail, for example, but not by way of limitation, with reference to FIGS. 7A and 7B. In a damper having a multi-layered structure in which high stiffness layers having relatively thicker thickness and low stiffness layers having relatively thinner thickness are alternately laminated, when a compressing force Fc in a radial direction of the damper and a shearing force Fs in the direction parallel to the bordering surfaces of the layers, i.e., in the radial direction are applied to the damper as shown in FIG. 7A, in the damper, a strain Ss in the axial direction due to the shearing force is greater than a strain Sc in the radial direction due to the compressing force as shown in FIG. 7B. That is, in the damper configured as above, whereas the stiffness in the axial direction is generally reduced due to the low stiffness layers to a relatively greater extent, the stiffness in the radial direction is reduced to a relatively smaller extent.

Again, referring to FIG. 6, for example, but not by way of limitation, with the damper 450 having the above multi-layered structure, while axial vibrations generated by the spindle motor 130 are restrained from being transferred to the cover plate 112 due to the relatively low stiffness in the axial direction, the rocking-mode frequency can be maintained in a sufficiently high state due to the relatively high stiffness in the radial direction.

Next, noises, rocking-mode frequencies, and fluttering of a hard disk drive according to an illustrative, non-limiting embodiment of the present invention will be described, for example, but not by way of limitation, while being compared with those of a conventional hard disk drive.

Figure 8:
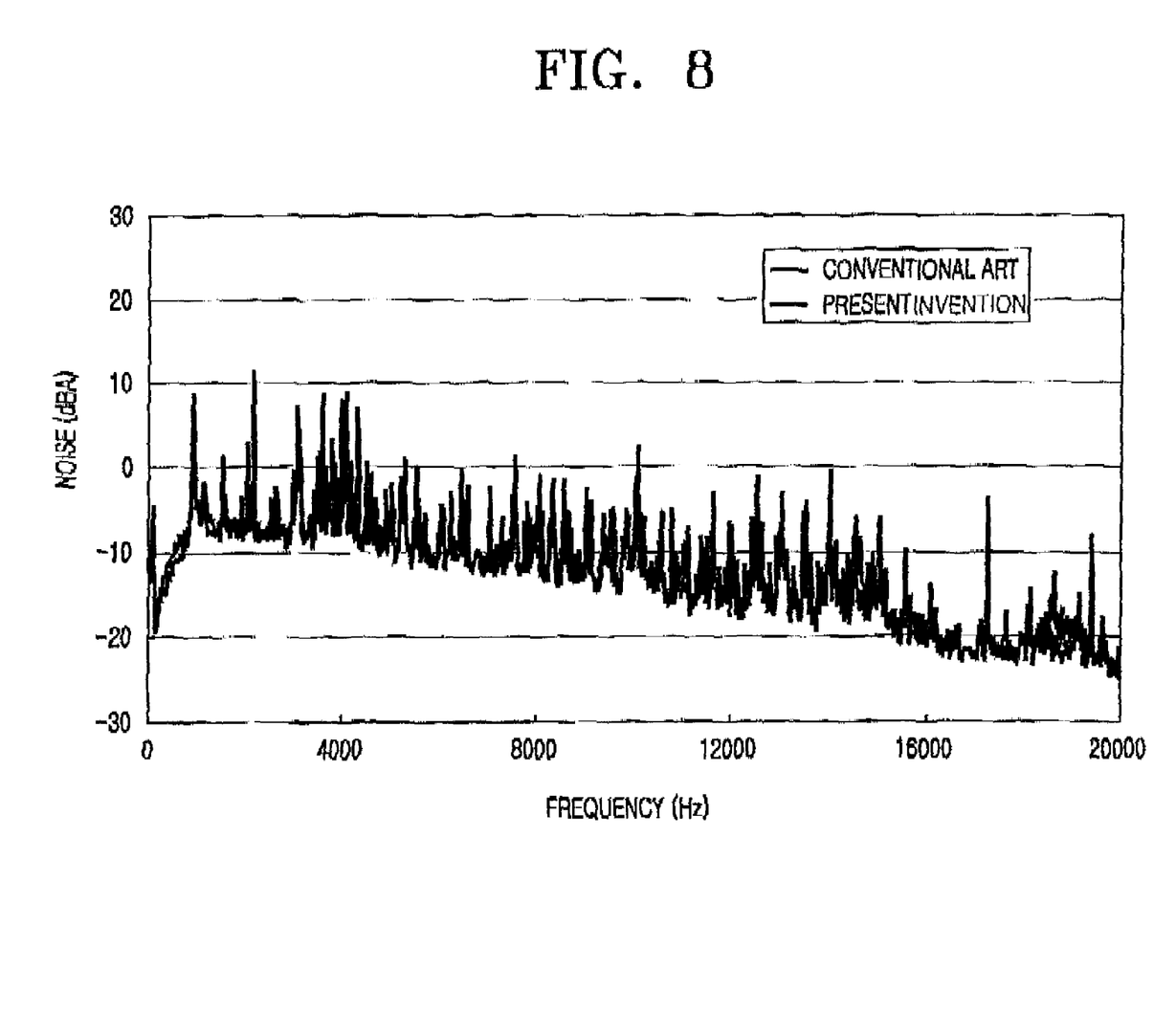
FIG. 8 is a graph illustrating spectra of noises of the hard disk drive according to the second illustrative, non-limiting embodiment of the present invention shown in FIG. 4 and a conventional hard disk drive.

FIG. 8 shows, for example, but not by way of limitation, a graph illustrating spectra of noises of the hard disk drive according to the second illustrative, non-limiting embodiment of the present invention shown in FIG. 4 and a conventional hard disk drive. Data shown in the graph were measured at the upper portion of the hard disk drives.

As shown in FIG. 8, for example, but not by way of limitation, it can be found that noises, shown in gray solid lines, of the hard disk drive according to the present invention are generally reduced as compared with those, shown in black solid lines, of the conventional hard disk drive.

The following Table 1 shows, for example, but not by way of limitation, noise values measured at the upper and lower portions of the hard disk drive according to the present invention and those of the conventional hard disk drive.

TABLE 1

| Position of Measurement | HDD (Present Invention) | HDD (Conventional) |
| --- | --- | --- |
| Upper Portion | 20.8 dBA | 21.2 dBA |
| Lower Portion | 21.5 dBA | 21.9 dBA |

Referring to Table 1, it can found that noises of the hard disk drive according to the present invention were, for example, but not by way of limitation, reduced by about 0.4 dBA at the upper and lower portions when compared with those of the conventional hard disk drive. Thus, in the hard disk drive according to the illustrative, non-limiting embodiment of the present invention, since vibrations generated by the spindle motor are restrained from being transferred to the cover plate due to the damper interposed between the screw and the cover plate, vibrations of the whole hard disk drive are reduced, and accordingly noises thereof are also reduced.

Figure 9A:
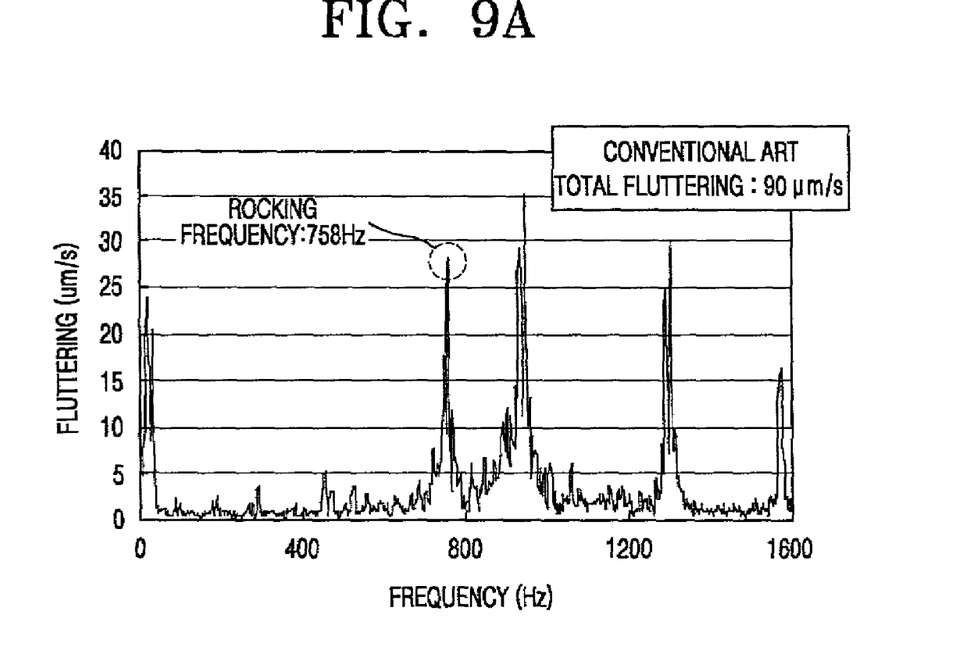
FIGS. 9A and 9B are graphs illustrating rocking frequencies and disk fluttering of the hard disk drive according to the second illustrative, non-limiting embodiment of the present invention shown in FIG. 4 and a conventional hard disk drive.
Figure 9B:
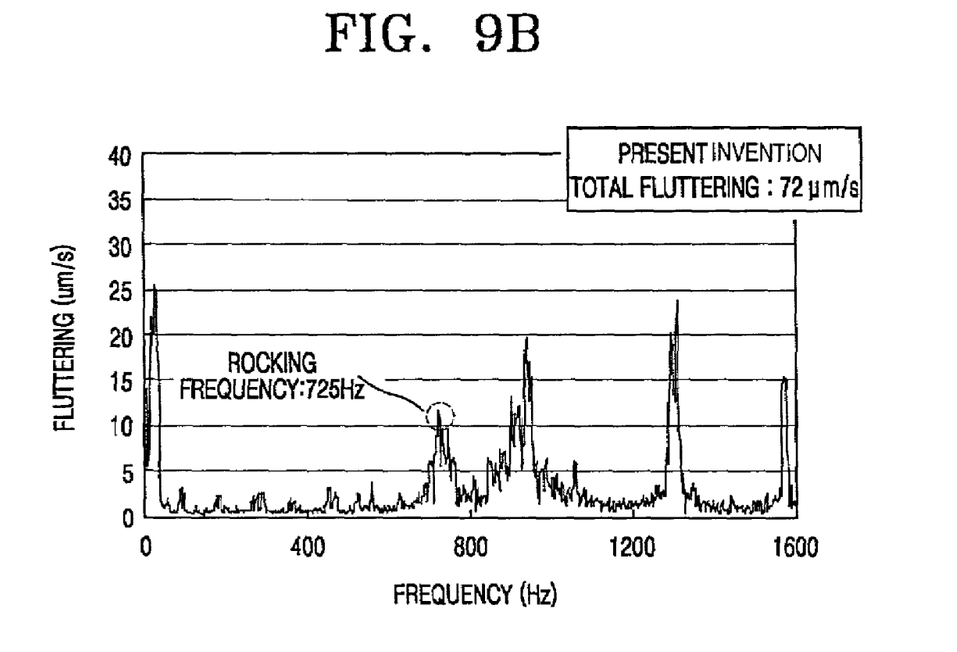

FIGS. 9A and 9B are graphs illustrating, for example, but not by way of limitation, rocking frequencies and disk fluttering of the hard disk drive according to the second illustrative, non-limiting embodiment of the present invention shown in FIG. 4 and a conventional hard disk drive. Further, FIG. 9A shows, for example, but not by way of limitation, rocking frequencies and disk fluttering of the conventional hard disk drive. Moreover, FIG. 9B shows, for example, but not by way of limitation, rocking frequencies and disk fluttering of the hard disk drive according to the present invention.

Referring to FIGS. 9A and 9B, for example, but not by way of limitation, since a rocking frequency of the hard disk drive according to the illustrative, non-limiting embodiment of the present invention is about 725 Hz, it can be found that the rocking frequency thereof was not substantially lowered as compared with a rocking frequency of 758 Hz of the conventional hard disk drive. This means that a sufficiently high rocking frequency can be maintained according to the illustrative, non-limiting embodiment of the present invention, and therefore resonance phenomena do not occur, which occur when the rocking frequency matches a vibration frequency of the spindle motor due to allowable tolerance, assembly tolerance, and the like of a ball bearing of the spindle motor, which exists in a relatively low frequency band, for example, in the vicinity of 500 Hz.

In addition, since total fluttering of the hard disk drive according to the illustrative, non-limiting embodiment of the present invention is about 72 μm/s, it can be found that the total fluttering is markedly lowered when compared with total fluttering 90 μm/s of the conventional hard disk drive. In particular, with the present invention, vibration at the rocking frequency decreases markedly. The reason is that the damper installed at the upper portion of the spindle motor absorbs the vibration energy of the spindle motor, and damps disk fluttering.

As described above, for example, but not by way of limitation, with the hard disk drive provided with a vibration reducing damper according to the illustrative, non-limiting embodiment of the present invention, since vibrations generated by the spindle motor are restrained from being transferred to the cover plate due to the damper while the rocking mode frequency is kept to be sufficiently high due to the damper, noises can be reduced in the whole hard disk drive.

In addition, since the damper damps vibrations of the spindle motor to reduce disk fluttering, reliability of recording/reproduction of data to/from a disk can be enhanced.

While this invention has been particularly shown and described with reference to illustrative, non-limiting embodiments thereof, the illustrative embodiments are not meant to limit the present invention to those implementations. Further, it will be understood by those skilled in the art that various changes in form and details may be made therein without departing from the spirit and scope of the invention as defined by the appended claims.

What is claimed is:

1. A hard disk drive comprising:
   a housing comprising a base plate and a cover plate provided with a through hole;
   a spindle motor comprising a shaft which is supported on the base plate and the upper end of which is joined to the cover plate by a screw inserted through the through hole, and a hub installed around the outer circumference of the shaft to be rotatable;
   at least one data storage disk joined to the outside of the hub and capable of being rotated together with the hub;
   a head assembly for recording data onto the disk and reading recorded data from the disk; and
   a damper having at least a portion disposed in the hole so as to be interposed between the screw and the cover plate, the damper comprising at least one viscoelastic material layer,
   the damper having multiple layers which are stacked in a direction from the screw to an inner circumferential surface of the through hole, such that an inner most layer of the damper contacts the screw without contacting the inner circumferential surface of the through hole; and an outermost layer of the damper contacts the inner circumferential surface of the through hole without contacting the screw,
   wherein the damper restrains vibrations generated by the spindle motor from being transferred to the cover plate, thereby reducing noises, and
   wherein the damper damps the vibrations, thereby reducing fluttering of the disk.

2. The hard disk drive as claimed in claim 1, wherein the damper comprises a ring-shaped viscoelastic material layer.

3. The hard disk drive as claimed in claim 2, wherein the damper is formed by attaching a viscoelastic material layer having a predetermined thickness directly to the outer circumferential surface of the head portion of the screw.

4. The hard disk drive as claimed in claim 1, wherein at least one high stiffness layer having relatively higher stiffness and at least one low stiffness layer having relatively lower stiffness are alternately laminated.

5. The hard disk drive as claimed in claim 4, wherein the damper has a dual-layered structure, and is configured so that the high stiffness layer contacts the screw and the low stiffness layer contacts the inner circumferential surface of the through hole.

6. The hard disk drive as claimed in claim 4, wherein the damper has a dual-layered structure and is configured so that the low stiffness layer contacts the screw and the high stiffness layer contacts the inner circumferential surface of the through hole.

7. The hard disk drive as claimed in claim 4, wherein the damper has a tri-layered structure composed of two high stiffness layers and one low stiffness layer interposed between the two high stiffness layers.

8. The hard disk drive as claimed in claim 4, wherein a plurality of high stiffness layers and a plurality of low stiffness layers are alternately laminated.

9. The hard disk drive as claimed in claim 8, wherein the inner most layer of the damper, which contacts the screw, and the outer most layer of the damper, which contacts the inner circumferential surface of the through hole, are the high stiffness layers.

10. The hard disk drive as claimed in claim 4, wherein the thickness of the low stiffness layer is thinner than the thickness of the high stiffness layer.

11. The hard disk drive as claimed in claim 4, wherein the high stiffness layer is made of a metal or plastic material.

12. The hard disk drive as claimed in claim 1, wherein the screw has a head portion and the layers are in the form of rings which project in a radial direction from the head portion.

13. The hard disk drive as claimed in claim 1, wherein the viscoelastic material comprises rubber or resin.

14. The hard disk drive as claimed in claim 1, wherein the screw has a head portion, and the damper is positioned between an outer circumference surface of the head portion of the screw and an inner circumferential surface of the through hole.

15. The hard disk drive as claimed in claim 1, wherein one of the layers has a higher stiffness than another layer.

16. The hard disk drive as claimed in claim 15, wherein the layers contact one another in a plane that extends toward an opening of the hole.

17. The hard disk drive as claimed in claim 1, wherein the screw has a head portion and the damper has a stepped portion so that the head portion can be seated on the stepped portion.

18. A hard disk drive comprising:
   a housing comprising a base plate and a cover plate provided with a through hole;
   a spindle motor comprising a shaft which is supported on the base plate and the upper end of which is joined to the cover plate by a screw inserted through the through hole, and a hub installed around the outer circumference of the shaft to be rotatable;
   at least one data storage disk joined to the outside of the hub and capable of being rotated together with the hub;
   a head assembly for recording data onto the disk and reading recorded data from the disk; and
   a damper which is interposed between the screw and the cover plate, the damper comprising at least one viscoelastic material layer,
   wherein the damper restrains vibrations generated by the spindle motor from being transferred to the cover plate, thereby reducing noises,
   wherein the damper damps the vibrations, thereby reducing fluttering of the disk,
   wherein the damper has a multi-layered structure in which a plurality of high stiffness layers having a relatively higher stiffness and a plurality of low stiffness layers having a relatively lower stiffness are alternately laminated, and
   wherein the inner most layer of the damper, which contacts the screw, and the outer most layer of the damper, which contacts an inner circumferential surface of the through hole, are the high stiffness layers.

* * * * *